United States Patent
Bening et al.

(10) Patent No.: US 6,242,538 B1
(45) Date of Patent: *Jun. 5, 2001

(54) PROCESS FOR MAKING HYDROGENATED GEL-FREE FUNCTIONALIZED ANIONICALLY POLYMERIZED POLYMERS

(75) Inventors: Robert Charles Bening, Katy; Carl Lesley Willis, Houston, both of TX (US); John David Wilkey, Evansville, IN (US); Zaida Diaz, Houston, TX (US)

(73) Assignee: Shell Oil Company, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/304,915

(22) Filed: May 4, 1999

Related U.S. Application Data

(60) Provisional application No. 60/087,920, filed on Jun. 4, 1998.

(51) Int. Cl.⁷ ........................................ C08F 8/04
(52) U.S. Cl. .................. 525/338; 525/332.8; 525/332.9; 525/333.1; 525/333.2; 525/339
(58) Field of Search ...................... 525/338, 339

(56) References Cited

U.S. PATENT DOCUMENTS

| | | | |
|---|---|---|---|
| 3,281,335 | 10/1966 | Wentz, Jr. et al. | 203/39 |
| 3,287,344 | 11/1966 | Strobel | 260/94.7 |
| 3,448,160 | 6/1969 | Schleimer | 260/669 |
| 4,028,485 | 6/1977 | Poloso et al. | 528/486 |
| 4,442,039 | 4/1984 | Murphy et al. | 260/465.4 |
| 4,480,075 | 10/1984 | Willis | 525/247 |
| 4,518,753 | 5/1985 | Richards et al. | 526/177 |
| 4,851,476 * | 7/1989 | Willis | 525/338 |
| 5,063,190 | 11/1991 | Hargis et al. | 502/157 |
| 5,166,277 | 11/1992 | Goodwin et al. | 525/338 |
| 5,171,791 | 12/1992 | Marchand et al. | 525/314 |
| 5,175,247 | 12/1992 | Magni et al. | 528/485 |
| 5,202,499 | 4/1993 | Hargis et al. | 568/587 |
| 5,216,181 | 6/1993 | Hargis et al. | 549/513 |
| 5,391,663 * | 2/1995 | Bening et al. | 525/338 |
| 5,397,851 | 3/1995 | Knauf et al. | 526/92 |
| 5,412,045 | 5/1995 | Osman et al. | 526/133 |

FOREIGN PATENT DOCUMENTS

| | | |
|---|---|---|
| 48-066678 | 9/1973 | (JP) . |
| 08269126 | 10/1996 | (JP) . |

OTHER PUBLICATIONS

"Solid–State NMR of Aromatic Polyamides," by S. A. Curran, C. P. LaClair, and S. M. Aharoni, *Macromolecules* 1991, 24, pp. 5903–5909.

*Comprehensive Organometallic Chemistry*, vol. 7, pp. 424–427, 1982.

\* cited by examiner

*Primary Examiner*—Bernard Lipman
(74) *Attorney, Agent, or Firm*—Donald F. Haas

(57) ABSTRACT

This invention relates to a process for making gel-free functionalized polymers. When multi-lithium initiators are used to make these polymers anionically, the process comprises anionically polymerizing at least one monomer with a multi-lithium initiator in a hydrocarbon solvent, functionalizing the polymer by adding to the polymer a capping agent that reacts with the ends of the polymer chains such that strongly-associating chain ends are formed wherein a polymer gel is formed, adding a trialkyl aluminum compound to the polymer gel, whereby the gel dissipates, adding a sufficient amount of a proton source to provide at least 1 mole of protons per mole of lithium ions and at least 2 moles of protons per mole of aluminum wherein the proton source is an organic acid with a $pK_a$ of 11 or less or a mixture of the organic acid and an alkanol, provided that sufficient organic acid is added to provide at least 0.4 moles of protons per mole of lithium ions, hydrogenating the polymer with a hydrogenation catalyst, and optionally washing the polymer with aqueous mineral acid in sufficient.

32 Claims, No Drawings

PROCESS FOR MAKING HYDROGENATED GEL-FREE FUNCTIONALIZED ANIONICALLY POLYMERIZED POLYMERS

This application claims the benefit of U.S. Provisional Application No. 60/087,920, filed Jun. 4, 1998, the entire disclosure of which is hereby incorporated by reference.

FIELD OF THE INVENTION

This invention relates to a gel-free process for making functionalized polymers, primarily functionalized anionic polymers which are made using multi-lithium initiators. More particularly, this invention relates to a gel-free process for making polydiene diols.

BACKGROUND OF THE INVENTION

Functionalized anionically polymerized polymers of conjugated dienes and other monomers wherein the functionalization is terminal and/or internal are known. Particularly, U.S. Pat. No. 5,393,843 describes polybutadiene polymers having terminal functional groups. One of the methods described for making such polymers involves anionic polymerization utilizing a dilithium initiator such as the adduct derived from the reaction of m-diisopropenylbenzene with two equivalents of s-BuLi. Monomer is added to the initiator in hydrocarbon solution and anionic living polymer chains grow outwardly from the ends of the dilithium initiator. These polymers are then capped to form functional end groups as described in U.S. Pat. Nos. 4,417,029, 4,518,753, and 4,753,991. Of particular interest herein are terminal hydroxyl, carboxyl, sulfonate, and amine groups.

It has been observed that when the living polymer is reacted with the commonly available "capping" agents, the polymer in the hydrocarbon solution forms a gel. For purposes of this invention, a polymer gel is defined as a blend of a polymer and a hydrocarbon solvent that has a yield stress, that is, it will not flow unless it is acted on by at least some critical stress. A polymer gel as defined herein will require a significant application of force in order to initiate flow through an orifice. Of particular interest are gels that will not flow under the force of their own weight. The presence of gel that will not flow under the force of its own weight is readily detected by visual observation. This effect is observed by inverting a bottle containing the solution to see whether it flows to the bottom of the inverted flask. Gelled solutions will not readily flow to the bottom of the bottle.

The physical characteristics of these gels make them more difficult to handle in equipment which is designed for moving, mixing, or combining freely flowing liquids, i.e. materials without a significant yield stress. Pumps, reactors, heat exchangers, and other equipment that are normally used for making polymer solutions that can be characterized as viscous fluids are not typically suited to handling polymer gels. Thus, one would expect that processing equipment likely to be found at a manufacturing location that is designed to handle liquid polymer solutions, as defined above, would be ill suited to handling gels of this nature.

If the living carbon—alkali metal endgroups (chain ends) are first transformed to the "ate" complex (aluminate) by reaction with a trialkylaluminum compound, the addition of EO occurs nearly quantitatively, without the formation of gel. Addition of a trialkylaluminum compound can also dissipate a gel of this kind that has already formed. The molar ratio of the trialkyl aluminum compound to the polymer chain ends is generally at least 0.1:1, preferably 0.33:1 and most preferably 0.66:1 to 1:1 since this results in a freely flowing solution. Unfortunately, at the preferred aluminum levels, the hydrogenation activity of the Ni/Al catalysts that are often used in the hydrogenation of these polymers is poor. Substantially more catalyst and longer reaction time are required to reach an acceptable level of residual unsaturation in the trialkylaluminum—containing cements than in controls prepared in the absence of aluminum. The present invention provides a method whereby polymers using trialkylaluminum to mitigate the gel problem can be efficiently hydrogenated.

It is common practice to add an alkanol, such as methanol, to neutralize the basicity of the solution (known as the polymer cement) after the polymerization reaction prior to hydrogenation. Previously we found that addition of methanol at this point was preferable to omitting the alcohol or adding other alcohols, such as 2-ethylhexanol, but hydrogenation performance was poor compared to samples prepared without the added alkyl aluminum. We found that it was preferred to remove the aluminum and lithium by contact with aqueous mineral acid. This improvement resulted in a substantial improvement in both the rate of hydrogenation and the extent of hydrogenation at a given catalyst level. While this process represents a substantial improvement over the state of the art, it introduces an additional process step. It can be seen that it would be advantageous to accomplish the same result without the necessity of an additional process step.

SUMMARY OF THE INVENTION

This invention relates to a gel-free process for making functionalized polymers. In this second embodiment, the aluminum trialkyl may be added before or during polymerization or before or with the capping agent (i.e., before a gel can form-prior to any reaction of the alkali metal with the gel-forming functionality). When multi-lithium initiators are used to make these polymers anionically, the process comprises anionically polymerizing at least one monomer with a multi-lithium initiator in a hydrocarbon solvent, functionalizing the polymer by adding to the polymer a capping agent that reacts with the ends of the polymer chains such that strongly-associating chain ends are formed, resulting in a polymer gel, adding a trialkyl aluminum compound to the polymer gel, whereby the gel dissipates, adding a proton source to eliminate the gel-forming OLi wherein the proton source can be an organic acid with a $pK_a$ of 11 or less or a mixture of an alkanol and the organic acid, hydrogenating the polymer with a hydrogenation catalyst, optionally washing the polymer with aqueous acid to extract the lithium and catalyst residue, and optionally washing the polymer with water or aqueous base to extract the organic acid. In the reagent that is the proton source, there must be at least 1 mole of protons per mole of lithium ions in the polymer cement and at least 0.4 of those must come from the organic acid, preferably from 0.5 to 1. There must also be at least 2 moles of protons per mole of aluminum in the polymer cement. The organic acid can be a carboxylic acid such as citric acid, a mineral acid ester such as di-2-ethylhexylphosphoric acid, and an aromatic alcohol such as phenol since these are acids and have a $pK_a$ of 11 or less.

In a second embodiment, the present invention relates to a process for making such polymers which comprises anionically polymerizing them as described, adding to the polymer a trialkyl aluminum compound, and then adding the capping reagent, adding a proton source, and washing and hydrogenating the polymer as described above. In this second embodiment, the aluminum trialkyl may be added before or during polymerization or before or with the capping agent (i.e., before a gel can form-prior to any reaction of the alkali metal with the gel-forming functionality). In the first embodiment, a gel is formed and then removed. In the second embodiment, the gel never is formed because of the presence of the trialkyl aluminum compound.

DETAILED DESCRIPTION OF THE INVENTION

This invention relates to functionalized polymers and processes for avoiding gel formation, especially when such polymers are made by anionic polymerization using di- or multi-alkali metal, generally lithium, initiators. Sodium or potassium initiators can also be used. For instance, polymers which can be made according the present invention are those made from any anionically polymerizable monomer, especially including terminal and internal functionalized polydiene polymers, including random and block copolymers with styrene. Styrene copolymers hereunder can be made in the same manner as the polydiene polymers and can be random or block copolymers with dienes.

In general, when solution anionic techniques are used, copolymers of conjugated diolefins, optionally with vinyl aromatic hydrocarbons, are prepared by contacting the monomer or monomers to be polymerized simultaneously or sequentially with an anionic polymerization initiator such as group IA metals, their alkyls, amides, silanolates, naphthalides, biphenyls or anthracenyl derivatives. It is preferred to use an organo alkali metal (such as lithium or sodium or potassium) compound in a suitable solvent at a temperature within the range from about −150° C. to about 150° C., preferably at a temperature within the range from about −70° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4. The organolithium initiators are preferred for polymerization at higher temperatures because of their increased stability at elevated temperatures.

Functionalized polydiene polymers, especially terminally functionalized polybutadiene and polyisoprene polymers, optionally as copolymers, either random or block, with styrene, and their hydrogenated analogs are preferred for use herein. Especially preferred are polybutadiene diols. Such polymers are made as generally described above. One process for making these polymers is described in U.S. Pat. No. 5,393,843, which is herein incorporated by reference.

Using a polydiene diol as an example, butadiene is anionically polymerized using a difunctional lithium initiator such as the reaction product of diisopropenylbenzene with sec-butyllithium. The living chain ends are then capped with a capping agent such as described in U.S. Pat. Nos. 4,417,029, 4,518,753, and 4,753,991, which are herein incorporated by reference. There are many multilithium initiators that can be used herein. The di- s-butyllithium adduct of m-diisopropenylbenzene is preferred because of the relatively low cost of the reagents involved and the relative ease of preparation. Diphenylethylene, styrene, butadiene, and isoprene will also work well to form dilithium or disodium initiators by the reaction:

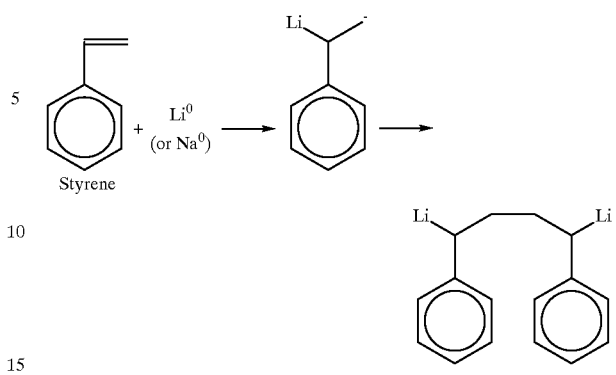

Still another compound which will form a diinitiator with an organo alkali metal such as lithium and will work herein is the adduct derived from the reaction of 1,3-bis(1-phenylethenyl)benzene (DDPE) with two equivalents of a lithium alkyl:

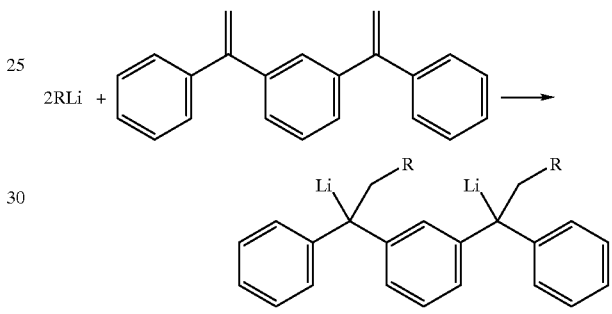

Related adducts which are also known to give effective dilithium initiators are derived from the 1,4-isomer of DDPE. In a similar way, it is known to make analogs of the DDPE species having alkyl substituents on the aromatic rings to enhance solubility of the lithium adducts. Related families of products which also make good dilithium initiators are derived from bis[4-(1-phenylethenyl)phenyl]ether, 4,4'-bis(1-phenylethenyl)-1,1'-biphenyl, and 2,2'-bis[4-(1-phenylethenyl)phenyl]propane (See L. H. Tung and G. Y. S. Lo, Macromolecules, 1994, 27, 1680–1684 (1994) and U.S. Pat. Nos. 4,172,100, 4,196,154, 4,182,818, and 4,196,153 which are herein incorporated by reference). Suitable lithium alkyls for making these dilithium initiators include the commercially available reagents (i.e., sec-butyl and n-butyl lithium) as well as anionic prepolymers of these reagents, polystyryl lithium, polybutadienyl lithium, polyisoprenyl lithium, and the like.

The polymerization is normally carried out at a temperature of 20 to 80° C. in a hydrocarbon solvent. The solution/dispersion/slurry of the polymer in the solvent is called the polymer cement. The cement usually has a solids (polymer) content in the range of 10 to 30 percent by weight (wt %) but it can range from 5 to 70 wt %. Suitable solvents include straight and branched chain hydrocarbons such as pentane, hexane, octane and the like, as well as alkyl-substituted derivatives thereof; cycloaliphatic hydrocarbons such as cyclopentane, cyclohexane, cycloheptane and the like, as well as alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like;

linear and cyclic ethers such as dimethyl ether, methylethyl ether, diethyl ether, tetrahydrofuran and the like. The capping reaction is carried out in the same solution and usually at about the same temperature as the polymerization reaction, as a matter of convenience.

Anionic polymerization is often terminated by addition of water to remove the lithium from the polymer chain end as lithium hydroxide (LiOH) or by addition of an alcohol (ROH) to remove the lithium as a lithium alkoxide (LiOR). To prepare polymers having an additional hydroxyl terminal functional groups, the living polymer chains are preferably terminated by addition of ethylene oxide, oxetane, or 2,2-dimethyloxetane. To prepare polymers having an additional terminal functional group that is carboxyl, the living polymer chains are preferably terminated by addition of carbon dioxide. To prepare polymers having an additional terminal functional group that is phenolic, the living polymer chains are preferably terminated by addition of a protected hydroxystyrene monomer. To prepare polymers having an additional terminal functional group that is epoxy, the living polymer chains are preferably terminated by addition of ethylene oxide to make the lithium alkoxide (OLi) chain end which is then reacted with epichlorohydrin to make the glycidol ether epoxide. To prepare polymers having an additional terminal functional group that is an amine, the living polymer chains are preferably terminated by addition of an aziridine reagent such as that listed in U.S. Pat. No. 4,791,174 which is herein incorporated by reference.

The general class of capping agents useful herein which form strongly associating chain ends and cause gelation are those which form alkali metal-O or alkali metal-N (preferably, LiO and LiN) bonds. Specific capping agents which are highly useful herein include ethylene oxide and substituted ethylene oxide compounds, oxetane and substituted oxetane compounds, aldehydes, ketones, esters, anhydrides, carbon dioxide, sulfur trioxide, aminating agents which form lithium imides, especially imines, and suitable reactive amine compounds like 1,5-diazabicyclohexane as described in U.S. Pat. No. 4,816,520 which is herein incorporated by reference. At least 0.1 mole of capping agent per mole of polymer chain end is necessary to give sufficient functionalization for most applications. It is preferred that from 1 to 10 moles of the capping agent per mole of polymer chain end be used in the capping of the polymer although the upper limit is only a practical one determined by cost benefit.

At this point in the process, the polymer forms a gel. A trialkyl aluminum compound is then added to this gel which then dissipates. The alternative process involves adding the trialkyl aluminum compound to the polymer mixture before the alkali metal reacts with the gel-forming functionality to form a gel. It may be added before, during, or after polymerization. In these cases, no polymer gel forms. If the trialkyl aluminum is added before or during polymerization, then less than a molar ratio of Al:Li of 1:1 should be added because the polymerization will stop if the ratio reaches 1:1. In yet another alternative, the trialkyl aluminum compound is added at the same time as the capping reagent. It may be premixed with the capping agent or just added to the reactor at the same time as the capping reagent. In this process, no polymer gel forms. Using triethyl aluminum as an example, it is believed that the mechanism of these two processes, adding the trialkyl aluminum reagent either before or after capping, is as follows:

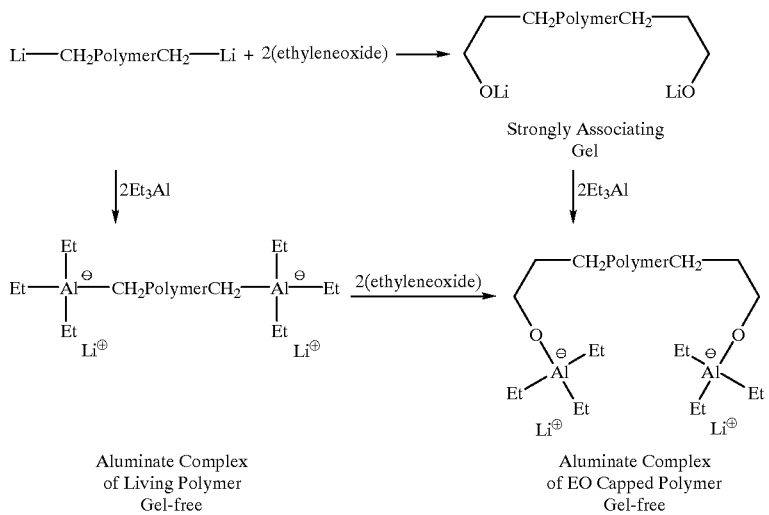

As described above, gel is avoided or removed by addition of a trialkyl aluminum compound. It is important that the chain end retains activity for nucleophilic substitution reactions after the "ate" complex has formed. Even after the trialkyl aluminum reagent has been added and the "ate" complex has formed, the chain end is still capable of further reaction. The trialkyl aluminum compounds used in the present invention are those wherein the alkyl groups contain from 1 to 10 carbon atoms. Preferred trialkyl aluminum compounds are triethylaluminum, trimethylaluminum, tri-n-propylaluminum, tri-n-butylaluminum, triisobutylaluminum, tri-n-hexylaluminum, and trioctylaluminum because these reagents are readily available in commercial quantities. Triethylaluminum is most preferred as it is least expensive on a molar basis.

The molar ratio of the trialkyl aluminum compound to the polymer chain ends is generally at least 0.1:1, preferably 0.33:1 and most preferably 0.66:1 to 1:1 since this results in a freely flowing solution. If it is less than 0.1:1, then the level of reduction in gel is too low to give an observable reduction in either the shear stress or the viscosity of the solution. If the ratio is more that 1:1, then the cost goes up unnecessarily but the advantages are still achieved. It is advantageous to be able to use less aluminum for cost purposes.

As discussed above, it has been known to reduce the basicity in the functionalized polymer cements by adding methanol. The hydrogenation of this methanol-neutralized cement is difficult in the presence of the aluminum alkyl. We have found that if an organic proton source which has a $pK_a$ of 11 or less is added to the cement at this point in the process, the hydrogenation of the cement is greatly enhanced. Adding an aromatic alcohol, carboxylic acid, or other organic compound that is more acidic than methanol (has a $pK_a$ of 11 or less), alone or in addition to methanol or another alkanol in the neutralization step has been found to greatly improve hydrogenation catalyst performance. In general, the best results were obtained when at least one proton from the organic acid was present per mole of polymer (0.5 protons per lithium). Thus, this invention provides a simpler process for making hydrogenated telechelic polymers, particularly telechelic diol polymers. $pK_a$ values for representative organic compounds are tabulated in J. March "Advanced Organic Chemistry, 4th Edition," (pages 250–251).

There must be at least 1 mole of protons per mole of lithium ions in the polymer cement. The practical range of operation is a total proton to lithium ion mole ratio of 1:1 to 5:1, preferably 1:1 to 1.5:1. At least 0.4 moles of the protons must come from the organic acid which has a $pK_a$ of 11 or less, preferably from 0.5 to 1. There must also be at least 2 moles of protons per mole of aluminum in the polymer cement. All of the protons can be provided by the organic acid but it is also acceptable, within the foregoing limitations, to use an alkanol, such as methanol, ethanol, propanol, butanol and 2-ethylhexanol. Organic acids which can be used herein include aromatic alcohols such as phenol, 4-t-butylcatechol, catechol, m-cresol, p-cresol, 2,6-di-t-butyl-4-methylphenol, and hydroquinone, carboxylic acids such as citric acid, 2-ethylhexanoic acid, formic acid, acetic acid, propionic acid, oxalic acid, malonic acid, succinic acid, steric acid and the like, and mineral acid esters such as di-2-ethylhexylphosphoric acid, and mono-2-ethylhexylphosphoric acid.

The optimum ratio of organic acid to polymer chains and, therefore, to lithium ions and aluminum, depends on the choice of acid, but is related to both the strength ($pK_a$) and functionality (number of acid protons per mole) of the organic acid. The optimum ratios are readily determined experimentally as shown in the Examples. Relatively strong acids, such as carboxylic acids and mineral acid esters (which have a $pK_a$ of less than 5), are preferentially added so as to introduce 0.4 to 0.6 moles of acidic protons per lithium ion (about 1 mole per polymer chain for the polymers exemplified herein). For most phenolic or aromatic alcohol acids, which are generally weaker acids than the foregoing, it is preferable to provide at least 0.8 mole of phenolic protons per lithium ion. While the acid can be used as the sole source of the protons, it is preferred that an alkanol be used to provide at least some of the protons because of the problems that some acids can cause to the process and the process equipment. It is not necessary to add more than 2 moles of protons per mole of aluminum. With the exception of citric acid, adding more of the organic acid is not deleterious to hydrogenation performance in this range. However, additional acid results in little improvement in hydrogenation performance, while adding to the cost and complicating the recovery of the polymer. A practical range of operation is a ratio of protons from acid to lithium ions of 0.4:1 to 2:1, preferably 0.5:1 to 1:1.

In addition to the protons provided for the lithium ions, there must be at least 2 moles of protons provided per mole of aluminum. Preferably, there are at least 3 moles of protons provided per mole of aluminum. The protons for aluminum can come from the acid, the alkanol, or both. As for the lithium, it is not necessary to add more than 3 moles per mole of aluminum. A practical range of operation is a ratio of protons to aluminum of 2:1 to 5:1, preferably 3:1 to 3.5:1.

It is thus seen that it is important that the sum of the moles of protons available from the organic acid and the alkanol (generally methanol) is at least about equal to the number of moles of lithium ions plus twice the number of moles of aluminum. It is most preferable to add the organic acid after functionalization (capping), but prior to hydrogenation, and it is most preferable for the sum of moles of protons added to equal the sum of the moles of lithium ions and 3 times the moles of aluminum. If the polymer is di-initiated and the trialkylaluminum is added at a 1:1 ratio, as in these examples, these ratios can be easily expressed relative to the number of moles of polymer chains (assuming quantitative initiation by the di-initiator). Thus, it becomes preferable to add a sufficient quantity of alkanol and organic acid to provide at least six moles of protons per chain, most preferably eight.

For the purpose of these calculations, every carboxylic acid or phenolic alcohol functional group is assumed to be active. Thus, catechol (1,2 dihydroxybenzene) is assumed to contribute two equivalents of acidic protons per mole and citric acid is assumed to contribute three equivalents of acidic protons per mole.

There are a number of possible explanations for the inhibition of hydrogenation in the presence of organoaluminum compounds observed above. The products of alkylaluminum compounds and alcohols may still be reactive towards the catalyst, either blocking active sites or bridging particles, increasing the particle size and thus lowering the effective surface area. Also, addition of methanol does not truly neutralize the capped, such as with ethylene oxide, chains. The $pK_a$ of methanol is only slightly lower than that of higher aliphatic alcohols. It is likely that a significant population of lithium alkoxide-terminated chains is present even after methanol termination. Interaction of these chains with the catalyst may contribute to the difficulties encountered in hydrogenation, particularly in the presence of organoaluminum compounds. Phenols, mineral acid esters, and carboxylic acids are much more acidic than aliphatic alcohols. It is believed that their presence greatly decreases the concentration of ionized polymer chain ends. The poor performance observed when only two equivalents of the acid, and no alcohol, was added (see the Examples) suggest a role for the aluminum-alkyl (Al—R) bonds as well as the O—Li bonds.

In addition to its impact on hydrogenation, the downstream impact of the organic acid must be considered. Although low levels of the acids are tolerable in the final product, the majority of the acid must be removed. It is preferable to chose a phenol with enough volatility to be removed along with the solvent during the devolatilization of the polymer cement which is part of the normal finishing fo these polymers. Relatively low molecular weight phenols (phenol, cresol, catechol) are preferred over highly alkyl-substituted phenols such as 4-t-butylcatechol and butylatedhydroxytoluene (BHT), based on both of these considerations. Carboxylic acids as high in molecular weight as 2-ethylhexanoic acid can be extracted into aqueous base. Aqueous ammonium hydroxide is preferred over solutions of mineral bases such as sodium hydroxide or potassium hydroxide. Any residual ammonium hydroxide will be driven off as ammonia in the devolatilazation of the polymer cement.

Telechelic hydrogenated butadiene (EB) diol polymers within the scope of this invention are prepared by the following process. Butadiene is polymerized by a difunctional alkyl lithium initiator, such as is obtained by reacting two moles of an alkyl lithium reagent with one mole of diisopropenylbenzene, in a solvent consisting of a hydrocarbon, such as cyclohexane, and an ether microstructure modifier. After polymerization is complete, one equivalent (basis Li) of a trialkylaluminum compound such as triethylaluminum is added. At least one equivalent of ethylene oxide is added to introduce the desired hydroxyl endgroups (the capping reaction). Then the polymer is terminated with a mixture of methanol and an acid as described. This mixture is formulated to meet the following criteria: (1) provide a total of 8 moles of protons per diinitiated polymer chain (at least one equivalent of protons from the alkanol or the more acidic organic acid per mole of lithium and three equivalents per mole of Al), and (2) provide that at least one equivalent (preferably 2 equivalents if the organic acid is a phenol) of protons are from the more acidic organic acid (1 equivalent of protons per equivalent of Li). Hydrogenation can then be accomplished under conditions typical for these polymers with the standard hydrogenation catalysts, such as those described below.

Hydrogenation of polymers of conjugated dienes is typically accomplished with the use of nickel catalysts, as described in U.S. Pat. No. Re. 27,145 and U.S. Pat. No. 4,970,254 and U.S. patent application Ser. No. 07/785715 which are incorporated herein by reference. The preferred nickel catalyst is a mixture of nickel 2-ethylhexanoate and triethylaluminum. Hydrogenation may also be accomplished using the catalysts described in U.S. Pat. Nos. 3,415,759 and 5,057,582, which are herein incorporated by reference. These catalysts are made by contacting one or more Group VIII metal carboxylates (CAS version, Group VIIIA in the previous IUPAC form, and Groups VIII, IX and X in the new notation) with one or more alkyl alumoxanes which were prepared by reaction of an aluminum alkyl with water. As described in the above patents, such catalysts produce excellent results in that they selectively hydrogenate ethylenic unsaturation to a high degree while having no effect on the aromatic unsaturation. The preferred Group VIII metals are nickel and cobalt. Other homogeneous hydrogenation catalysts can be used including those made with Ti, Ru, Rh, etc. Heterogeneous hydrogenation catalysts can also be used including those made with Pt, Pd, Ni, Co, etc.

Subsequent to hydrogenation, the polymer solution is washed with aqueous mineral acid. It is important to select the acid strength and relative quantity of aqueous acid (phase ratio) so as to insure that all of the metal salts are soluble. If phosphoric acid is used, it is preferable to add a sufficient quantity to supply 1 equivalent of acid per equivalent of lithium and at least 3 equivalents of acid per mole of Al. It is also preferable to use a relatively concentrated acid solution at a relatively low phase weight ratio. For a 20% solids content in the cement wherein the polymer has a molecular weight of about 4,000, it is most preferable to conduct the wash using 20% wt. to 40% wt. aqueous phosphoric acid at a phase weight ratio between about 0.1:1 and 0.25:1 aqueous acid:cement and at a temperature of about 45° C. to 55° C. Although this extraction is relatively insensitive to mixing conditions, it is preferable to avoid unnecessarily high shear. The cement should be allowed to settle until substantially free of entrained water. It is preferable to minimize the mineral acid residues in the final product. In the case where the organic acid is a phenol, it is preferable to follow the acid wash with deionized water. The liquid polymer may then be isolated by devolatilization, preferably under vacuum. It is preferable to choose conditions that remove the majority of the phenol at the lowest practical temperature and minimize exposure to oxygen during finishing. If the organic acid is a carboxylic acid or ester of a mineral acid, it is preferable to extract the acid into aqueous base, most preferably aqueous ammonium hydroxide, prior to devolatilization.

EXAMPLES

Diol Synthesis Reactions

The synthesis conditions and characterization are described in Table 1. Unless otherwise specified, the initiators were prepared by adding two moles of s-butyllithium to one mole of m-diisopropenylbenzene in cyclohexane, in the presence of one mole of diethyl ether (DEE) per mole of lithium, at a temperature of 20° C. to 50° C. These initiators were used to polymerize butadiene in cyclohexane/10% wt. DEE in a 2 liter glass autoclave, targeting a butadiene number average molecular weight of 4,000 or 3,200. The initiator fragment and ethylene oxide (EO) endcaps add another 530. In general, the molecular weights were close to predicted (basis titration of the initiator) and polydispersities were relatively low, <1.2. Polymer solids in the cements were varied from 10% wt. to 20% wt. At greater than 10% solids, the monomer was added in several increments. An attempt was made to keep the polymerization temperature below 50° C. Vinyl contents in excess of 50% could be achieved if the average polymerization temperature was kept at or below about 25° C. Triethylaluminum (TEA) was chosen as the capping mediator and ethylene oxide (EO) was reacted with the living chain ends in order to introduce the desired hydroxyl endgroups. Unless otherwise specified, one mole of TEA was added per mole of chain ends. Ethylene oxide was generally added in at least 20% excess.

Unless otherwise specified, the capping reaction was carried out according to the following procedure. The desired quantity of about 16% to 25% wt. triethylaluminum solution was added and allowed to react with the living chain ends for 15 minutes. The reaction was exothermic enough to raise the temperature a few degrees. The yellow color of the polymer anion persisted, but the solution viscosity decreased noticeably, especially at higher polymerization solids. After 15 minutes, the EO charge was added and flushed in with about 44 grams of cyclohexane from a bomb attached above it, resulting in a temperature increase of a few degrees and a decrease in the color of the solution, but no increase in the viscosity.

After functionalization and before hydrogenation, the polymer cements were treated with either methanol or a combination of methanol and one of the organic acids listed in Table 1. The acid:polymer and methanol:polymer ratios listed in Table 1 assume quantitative initiation. With the exception of sample 23838-58 and the examples using citric acid, these ratios represent the addition of a total of 8 equivalents of protons per mole of initiator, assuming both phenolic protons of the dihydroxyphenols (catechol, hydroquinone, and 4-t-butylcatechol) are active. That is, enough of either the organic acid or methanol is present to react with the lithium alkoxide chain ends and satisfy all of the valences on the added aluminum.

Sample 23838-58 was initially terminated (neutralized) by adding two equivalents of m-cresol (no methanol). Hydrogenation performance (discussed in the following section) for this sample was poor, so four equivalents of methanol (for a total of six equivalents of protons per chain) were added during hydrogenation. Citric acid possesses 3 carboxylic acid groups and one hydroxyl per molecule. For the purpose of these calculations, citric acid was assumed to be trifunctional (contribute three equivalents of protons per mole).

Unless otherwise specified, acids that are solids at room temperature were dissolved in 50 g of diethyl ether and transferred into the reactor from a sample bomb 30 minutes after the EO was added. Methanol was then added from a separate bomb. Due to its low solubility in diethyl ether, citric acid was dissolved in the calculated amount of methanol and both reagents were charged at once. Acids that are liquids at room temperature were added neat and flushed into the reactor with 44 grams of cyclohexane.

The solubility of the salts formed in the termination step varied considerably. No precipitate formed in cements terminated with catechol, 4-t-butylcatechol, or BHT, even after standing at room temperature overnight, while precipitates formed immediately upon addition of 2-ethylhexanoic acid, citric acid, and hydroquinone. Salts of phenol and m-cresol appeared to remain soluble at elevated temperatures. Any precipitate that was formed was re-suspended in the cement prior to transfer to the hydrogenation vessel. In the example in which DEPHA (di-2-ethylhexylphosphoric acid) was used as the terminating agent, 23838-55, the cement gelled on standing overnight However, the addition of 1–2 grams of methanol broke the gel and allowed hydrogenation to proceed.

For comparison, a polymerization was conducted without the addition of an alkyl aluminum reagent at 10% solids, EO was added, and the resulting gel was allowed to stand until the color of the entire reactor contents changed from the red-orange of the polymer anion to the pale yellow of the EO—capped diol. Methanol was added at a ratio of 8 moles per mole of DiLi initiator. The gel broke after standing overnight.

TABLE 1

Synthesis Conditions for Preparation of Diinitiated Butadiene Polymers and Capping with EO.

| Sample # | Polymerization | | Mn | Capping | | Termination | | |
|---|---|---|---|---|---|---|---|---|
| | [DiLi] (N) | % Solids | ($^1$H NMR) | TEA:Li | EO/Li | Acid | Acid:P[1] | MeOH:P[2] |
| 23838-9 | 0.48 | 10% | 6190 | None | 1.4 | none | — | 8:1 |
| 22930-90A | 0.38 | 10% | 5410 | 1:1[3] | 2.3 | none | — | 8:1 |
| 23838-13 | 0.48 | 10% | 2960 | 1:1 | 1.3 | BHT[4] | 4:1 | 4:1 |
| 23838-16 | 0.48 | 10% | 4020 | 1:1 | 1.6 | TBC[5] | 3:1 | 2:1 |
| 23838-20 | 0.48 | 10% | 3900 | 1:1 | 1.3 | TBC[5] | 2:1 | 41 |
| 23838-22 | 0.48 | 10% | 4170 | 1:1 | 1.5 | TBC[5] | 1:1 | 6:1 |
| 23838-24 | 0.48 | 20% | 4270 | 1:1 | 1.4 | TBC[5] | 1:1 | 6:1 |
| 23838-26 | 0.48 | 10% | 3940 | 1:1 | 1.3 | TBC[5] | 0.5:1 | 7:1 |
| 23838-28 | 0.48 | 10% | 4020 | 1:1 | 1.5 | phenol | 2:1 | 6:1 |
| 23838-30 | 0.52 | 10% | 4010 | 1:1 | 1.4 | catechol | 1:1 | 6:1 |
| 23838-32 | 0.52 | 10% | 3620 | 1:1 | 1.2 | phenol | 2:1 | 6:1 |
| 23838-34 | 0.52 | 10% | 4620 | 1:1 | 1.5 | m-cresol | 2:1 | 6:1 |
| 23838-36 | 0.52 | 10% | 3410 | 1:1 | 1.2 | hydroquinone | 1:1 | 6:1 |
| 23838-38 | 0.52 | 10% | 3760 | 1:1 | 1.3 | 2-EHA[6] | 2:1 | 6:1 |
| 23838-40 | 0.52 | 10% | 4050 | 1:1 | 1.4 | 2-EHA[6] | 1:1 | 7:1 |
| 23838-43 | 0.52 | 10% | 4000 | 1:1 | 1.4 | 2-EHA[6] | 3:1 | 5:1 |
| 23838-47 | 0.50 | 10% | 3740 | 1:1 | 1.3 | Mix'd cresols[7] | 2:1 | 6:1 |
| 23838-48 | 0.57 | 10% | 4650 | 1:1 | 1.6 | 2-EHA[6] | 0.5:1 | 7.5:1 |
| 23838-51 | 0.57 | 10% | 6030 | 1:1 | 2.1 | Citric acid | 1:1 | 5:1 |
| 23838-53 | 0.42 | 10% | 4900 | 1:1 | 1.5 | Citric acid | 0.3:1 | 7:1 |
| 23838-55 | 0.42 | 10% | 4190 | 1:1 | 1.3 | DEPHA[8] | 0.5:1 | 7:1[9] |
| 23838-58 | 0.42 | 10% | 3300 | 1:1 | 1.2 | m-cresol | 2:1 | 4:1 |

[1]ratio of moles of acid to moles of chains (assuming quantitative initiation).
[2]ratio of moles of methanol to moles of chains (assuming quantitative initiation).
[3]EO and TEA solution pre-mixed then added to polymer anion. This process has also been shown to result in efficient capping
[4]2,6-Di-t-butyl-4-methylphenol.
[5]4-t-butylcatechol.
[6]2-ethylhexanoic acid.
[7]PMC Specialties Group; 69%–78% m-cresol, 17%–28% phenol, 2%–9% p-cresol.
[8]Di-2-ethylhexylphosphoric acid.
[9]Gelled on standing overnight; broke on addition of 1–2 grams methanol.

Hydrogenation

Unless otherwise specified, hydrogenation reactions were carried out in a 1 gal. SS autoclave, using a Ni/Al catalyst prepared by reacting triethylaluminum and nickel octoate (Al:Ni≈2.6:1), according to the following general procedure. The polymer cement was transferred under nitrogen to the autoclave and sparged with hydrogen. The reactor was pressured up to 800 psi with hydrogen. The reactor temperature was adjusted to about 60° C. and then the first aliquot of catalyst solution was added. The autoclave was then heated to maintain a temperature of about 80° C. and reaction was allowed to proceed under 800 psi of $H_2$ for the desired time. Additional aliquots of catalyst were added as specified in Table 2 below. The extent of hydrogenation was determined using $^1$H NMR. These results are summarized in Table 2. The goal was to achieve a residual unsaturation (RU) as low as possible.

The final product was isolated as follows. The catalyst was oxidized and extracted with aqueous phosphoric acid (generally 20% wt). The ratio of aqueous acid to cement was chosen so as to insure the addition of at least one mole of $H_3PO_4$ for every mole of lithium and three moles for every mole of aluminum. Samples for further testing were either washed with deionized water until the pH of the settled aqueous phase was <5 or washed with concentrated (27% wt.) aqueous ammonium hydroxide and then dried in a rotary evaporator. Table 3 records the concentration of various organic acids in the polymer cement after washing with aqueous acid (catalyst extraction) and then either water or aqueous base.

TABLE 2

Summary of Hydrogenation Results for Phenol & Acid-Terminated Cements.

| | | | | 1st Catalyst Charge | | | | 2nd Catalyst Charge | | | | 3rd Catalyst Charge | | | |
|---|---|---|---|---|---|---|---|---|---|---|---|---|---|---|---|
| Run | Feed | termin ROH | PPM Ni | $T_{max}$ (° C.) | time (min) | RU (meq/g) | PPM Ni | added at time (min) | time (min) | RU (meq/g) | PPM Ni | added at Time (min) | time (min) | RU (meq/g) |
| 10 | 9 | MeOH | 50 | 74 | 60 | 2.43 | 150 | 60 | 120 | 1 | 250 | 120 | 180 | 0.49 |
| 90B | 90A | MeOH | 50 | 64 | 60 | 9.26 | 150 | 60 | 120 | 3.01 | 250 | 120 | 180 | 1.76 |
| 14 | 13 | 4 BHT[1] | 50 | 74 | 60 | 2.88 | 150 | 60 | 120 | 0.78 | 250 | 120 | 180 | 0.29 |
| 17 | 16 | 3 TBC[1] | 50 | 83 | 60 | 0.51 | 150 | 60 | 120 | 0.1 | 250 | 120 | 180 | 0.06 |
| 21 | 20 | 2 TBC[1] | 50 | 65 | 60 | 0.17 | 150 | 60 | 120 | 0.05 | 250 | 120 | 180 | 0.08 |
| 23 | 22 | 1 TBC[1] | 50 | 85 | 60 | 0.63 | 150 | 60 | 120 | 0.14 | 250 | 120 | 180 | 0.11 |
| 25 | 24 | 1 TBC[1] | 50 | 148 | 60 | 1.46 | 150 | 60 | 120 | 0.22 | 250 | 120 | 180 | 0.14 |
| 27 | 26 | 0.5 TBC[1] | 50 | 85 | 60 | 1.23 | 150 | 60 | 120 | 0.49 | 250 | 120 | 180 | 0.23 |
| 29 | 28 | 2 PhOH[1] | 50 | 72 | 60 | 2.93 | 150 | 60 | 120 | 1.24 | 250 | 120 | 180 | 0.33 |
| 31 | 30 | 1 Catechol[1] | 50 | 88 | 60 | 0.61 | 150 | 60 | 120 | 0.14 | 250 | 120 | 180 | 0.18 |
| 33 | 32 | 2 PhOH[1] | 50 | 80 | 60 | 1.91 | 150 | 60 | 120 | 0.77 | 250 | 120 | 180 | 0.31 |
| 35 | 34 | 2 m-cresol[1] | 50 | 86 | 60 | 1.48 | 150 | 60 | 120 | 0.61 | 250 | 120 | 180 | 0.26 |
| 37 | 36 | 1 hyQ[1] | 50 | 90 | 60 | 0.59 | 150 | 60 | 120 | 0.18 | 250 | 120 | 180 | 0.11 |
| 39 | 38 | 2 2EHA[1] | 50 | 100 | 60 | 0.83 | 150 | 60 | 120 | 0.14 | 250 | 120 | 180 | 0.09 |
| 41 | 40 | 1 2EHA[1] | 50 | 79 | 60 | 1.42 | 150 | 60 | 120 | 0.37 | 250 | 120 | 180 | 0.16 |
| 44 | 43 | 3 2EHA[1] | 50 | 99 | 60 | 0.41 | 150 | 60 | 120 | 0.15 | 250 | 120 | 180 | 0.07 |
| 45 | 47 | 2 mix'd cresol[1,4] | 50 | 78 | 60 | 1.94 | 150 | 60 | 120 | 0.86 | 250 | 120 | 180 | 0.43 |
| 49 | 48 | 0.5 2EHA[1] | 50 | 70 | 60 | 4.52 | 150 | 60 | 120 | 1.4 | 250 | 120 | 180 | 0.74 |
| 50 | 51 | 1 citric acid[1,2] | 50 | 70 | 60 | 4.28 | 150 | 60 | 120 | 3.19 | 250 | 120 | 180 | 2.47 |
| 54 | 53 | 0.3 citric acid[1] | 50 | 85 | 60 | 1.3 | 150 | 60 | 120 | 0.4 | 250 | 120 | 180 | 0.14 |
| 56 | 55 | 0.5 DEPHA[1,2] | 50 | 61 | 60 | 1.26 | 150 | 60 | 120 | 0.21 | 250 | 120 | 180 | 0.11 |
| 59 | 58 | 2 m-cresol, 4 MeOH | 50 | 81[3] | 60 | 0.15 | 150 | 60 | 120 | 0.07 | 250 | 120 | 180 | 0.06 |

[1]moles per mole of chain; unless otherwise specified, MeOH added so total OH:polymer = 8 (1 per Li, 3 per Al).
[2]gelled on standing overnight; broke with 1–2 g. MeOH.
[3]5° C. initial exotherm in the absence of methanol; maximum temperature after adding 4 equivalents of methanol.
[4]assume 73% m-cresol, 22% phenol, 5% p-cresol.

TABLE 3

Distribution of Organic Acid Modifiers Following Wash & Devolatilization

| | | | | Wash #1 | | | Wash #2 | | | | |
|---|---|---|---|---|---|---|---|---|---|---|---|
| sample | Terminating Agent | pred [ArOH] cement | pred [ArOH] neat | conditions | [ArOH] cement | % extr'd | conditions | [ArOH] cement | % extr'd | [ArOH] PPM | % ArOH Overhead |
| 25 | TBC | 0.93% | 4.60% | 30% $H_3PO_4$ | 0.87% | 6% | DIW | 0.81% | 12.90% | 28000 | 27.17% |
| 31 | catechol | 0.31% | 3.07% | 20% $H_3PO_4$ | 0.13% | 58% | DIW | 0.04% | 87.10% | 2500 | 4.89% |
| 33 | phenol | 0.53% | 5.25% | 20% $H_3PO_4$ | 0.06% | 89% | 27% $NH_4OH$ | 0.02% | 96.23% | 600 | 2.67% |
| 35 | m-cresol | 0.61% | 6.04% | 20% $H_3PO_4$ | 0.24% | 61% | 27% $NH_4OH$ | 0.11% | 81.97% | 5000 | 9.93% |
| 37 | hydroquinone | 0.31% | 3.07% | 20% $H_3PO_4$ | 0.002% | 99% | DIW | 0.00% | 99.68% | <50 | 0.00% |
| 48 | 2-EHA | 0.2% | 2.0% | 20% $H_3PO_4$ | — | — | 27% $NH_4OH$ | — | — | 209 | — |

The addition of organic acids prior to hydrogenation in these examples clearly had a favorable influence on hydrogenation. The residual unsaturation (RU) obtained after each catalyst addition was substantially lower than the example in which only methanol was added following reaction with EO in the presence of one equivalent of TEA (22930-90A) and, in most cases, was lower than or comparable to a control prepared by capping in the absence of trialkylaluminum (23838-9).

Effectiveness, as judged by improvement in the extent of hydrogenation at a given molar ratio of the organic acid to polymer chains, appears to be a function of both acidity and functionality (acid hydroxyl groups per molecule). Within the series of acids studied, a higher ratio of mono-hydroxy phenol (phenol, cresol, BHT) to chains (and, therefore, to lithium and aluminum) appears to be required to achieve a comparable improvement in hydrogenation than if a di-hydroxy phenol (hydroquinone, catechol, TBC) is used. Final RU levels comparable to those obtained in the presence of 2 moles of mono-hydroxy phenol (2 protons from the acid per chain) could be obtained by the addition of 1 equivalent of a di-hydroxy phenol. This observation provides evidence that both phenolic groups are active in the latter. Carboxylic acids appear to be more effective than di-hydroxy phenols, especially when considered on an equivalent basis, i.e. at the same ratio of protons from the acid per chain. The addition of one equivalent H+ per chain from 2-EHA (23838-41) resulted in a lower RU at a given catalyst level than the addition of one equivalent H+ per chain from TBC (23838-27). At the higher levels of 2-EHA, emulsion problems were encountered when the cement was contacted with aqueous acid (at a relatively high shear rate) to extract the nickel and aluminum. While the problem could be mitigated by washing at a lower shear rate, it is preferable to keep the 2-EHA:P ratio less than 2:1. The addition of one mole of citric acid per mole of polymer led to rather poor hydrogenation performance. The viscosity increased substantially during the hydrogenation. The addition of this much of a highly functional acid may lead to aggregation of the catalyst. However, excellent performance was observed when the ratio of citric acid to chains was decreased to 0.3 (one acidic proton per chain). DEPHA, the strongest acid studied, was most effective on a molar equivalents of protons basis. At 0.5 moles DEPHA (also 0.5 moles H+) per chain, a final RU of 0.11 meq/g was obtained. This is comparable to results obtained at twice the H+ added as 2-EHA or citric acid.

In all of the above examples, it was assumed that the presence of aluminum alkyl (Al—R) groups was deleterious to hydrogenation. A sufficient quantity of hydroxyl or acid functionality was provided to convert all of the Al—R bonds to Al—OR bonds. Run 23838-58 was carried out in order to determine if neutralization of the lithium alone was sufficient to ensure facile hydrogenation. When the cement was terminated with 2 moles (1 per Li) of m-cresol per mole of polymer (1 equivalent of phenolic protons per equivalent of lithium) and contacted with 50 ppm of Ni catalyst, a very weak exotherm was observed. This was taken to indicate very little hydrogenation, as exotherms in excess of 15° C. were observed in the previous examples. Sufficient methanol was then added to account for ⅔ of the expected Al—R groups. This resulted in a significant exotherm. The results summarized in Table 2 indicate that hydrogenation was efficient under these conditions, but the cement became quite viscous to the point of being difficult to transfer from the autoclave. Based on this observation, it is reasonable to conclude that it is preferable to add one equivalent of hydroxyl or acid protons per lithium and 3 equivalents of hydroxyl or acid protons per aluminum.

While low levels of the acids studied are generally expected to be tolerable in the final product, for some applications it may be desirable to remove the majority of the acid from the hydrogenated polymer. Table 3 summarizes some work done to determine how this is best accomplished. Although most of the phenols are soluble in water, contact with aqueous acid or deionized water could not be shown to quantitatively extract the phenol. While the extraction of catechol into water in run 31 looked promising, attempts to reproduce this result were inconclusive. Extraction into aqueous base was more efficient, but phenols are known to oxidize to strongly colored products, especially in the presence of base. All of the cements containing phenols contacted with aqueous base were colored. Likewise, the cement containing hydroquinone became strongly colored after contact with water. The low level of hydroquinone in the cement following contact with water may be a result of degradation rather than extraction. Carboxylic acids are expected to be readily extracted into aqueous base without forming colored products. Run 48 supports this conclusion. If a phenol is used to improve hydrogenation, these results suggest that it is best to chose a relatively volatile one and avoid oxygen and base during the devolatilization. Carboxylic acid-modified cements are preferably extracted with aqueous base.

We claim:

1. A process for making gel-free hydrogenated functionalized anionic polymers using multi-lithiuim initiators which comprises:
   (a) anionically polymerizing at least one monomer with a multi-lithium initiator in a hydrocarbon solvent,
   (b) functionalizing the polymer by adding to the polymer a capping agent that reacts with the ends of the polymer chains such that strongly-associating chain ends are formed resulting in a polymer gel,
   (c) adding a trialkyl aluminum compound to the polymer gel whereby the gel dissipates,
   (d) adding a sufficient amount of a proton source to provide at least 1 mole of protons per mole of lithium ions and at least 2 moles of protons per mole of aluminum wherein the proton source is an organic acid with a $pK_a$ of 11 or less or a mixture of the organic acid and an alkanol, provided that sufficient organic acid is added to provide at least 0.4 moles of protons per mole of lithium ions,
   (e) hydrogenating the polymer with a hydrogenation catalyst, and
   (f) optionally washing the terminated polymer with aqueous mineral acid.

2. The process of claim 1 wherein the organic acid is selected from the group consisting of carboxylic acids, aromatic alcohols, and mineral acid esters.

3. The process of claim 2 wherein the organic acid is selected from the group consisting of phenol, catechol, 4-t-butylcatechol, m-cresol, p-cresol, 2,6-di-t-butyl-4-methylphenol, citric acid, 2-ethylhexanoic acid, di-2-ethylhexylphosphoric acid, propanol, butanol, 2-ethylhexanol, hydroquinone, formic acid, acetic acid, propionic acid, oxalic acid, malonic acid, succinic acid, steric acid, and mono-2-ethylhexylphosphoric acid.

4. The process of claim 1 wherein the sufficient organic acid is added to provide from 0.5 to 1 moles of protons per mole of lithium ions.

5. The process of claim 1 wherein the organic acid has a $pK_a$ of less than 5.

6. The process of claim 5 wherein sufficient organic acid is added to provide from 0.4 to 0.6 moles of protons per mole of lithium ions.

7. The process of claim 1 wherein the organic acid is an aromatic alcohol.

8. The process of claim 7 wherein sufficient organic acid is added to provide from 0.8 to 1.0 moles of protons per mole of lithium ions.

9. The process of claim 1 wherein a sufficient amount of the proton source is added to provide at least 3 moles of protons per mole of aluminum.

10. The process of claim 1 wherein the initiator is a dilithium initiator.

11. The process of claim 1 wherein the concentration of the acid in step (f) is from 20 to 40 percent by weight and the phase weight ratio of aqueous acid to polymer cement of from 0.1:1 to 0.25:1.

12. The process of claim 1 wherein the capping agent is selected from the group consisting of those that form chain ends with LiO or LiN bonds.

13. The process of claim 1 wherein the monomer is butadiene or isoprene.

14. The process of claim 13 wherein the monomer is butadiene.

15. The process of claim 1 wherein the polymer is a polydiene diol.

16. The process of claim 15 wherein the polymer is a polybutadiene diol.

17. A process for making gel-free hydrogenated functionalized anionic polymers using multi-lithium initiators which comprises:
   (a) anionically polymerizing at least one monomer with a multi-lithium initiator in a hydrocarbon,
   (b) adding a trialkylaluminum compound before or during polymerization or before or at the same time as the capping agent, (c) functionalizing the polymer by adding to the polymer a capping agent which, in the absence of the trialkylaluminum compound, would react with the polymer chain ends to form strongly-associating chain ends resulting in a polymer gel, (d) adding a sufficient amount of a proton source to provide at least 1 mole of protons per mole of lithium ions and at least 2 moles of protons per mole of aluminum wherein the proton source is an organic acid with a $pK_a$ of 11 or less or a mixture of the organic acid and an alkanol, provided that sufficient organic acid is added to provide at least 0.4 moles of protons per mole of lithium ions, (e) hydrogenating the polymer with a hydrogenation catalyst, and (f) optionally washing the terminated polymer with aqueous mineral acid.

18. The process of claim 17 wherein the organic acid is selected from the group consisting of carboxylic acids, aromatic alcohols, and mineral acid esters.

19. The process of claim 18 wherein the organic acid is selected from the group consisting of phenol, catechol, 4-t-butylcatechol, m-cresol, p-cresol, 2,6-di-t-butyl-4-methylphenol, citric acid, 2-ethylhexanoic acid, di-2-ethylhexylphosphoric acid, propanol, butanol, 2-ethylhexanol, hydroquinone, formic acid, acetic acid, propionic acid, oxalic acid, malonic acid, succinic acid, steric acid, and mono-2-ethylhexylphosphoric acid.

20. The process of claim 17 wherein the sufficient organic acid is added to provide from 0.5 to 1 moles of protons per mole of lithium ions.

21. The process of claim 17 wherein the organic acid has a $pK_a$ of less than 5.

22. The process of claim 21 wherein sufficient organic acid is added to provide from 0.4 to 0.6 moles of protons per mole of lithium ions.

23. The process of claim 17 wherein the organic acid is an aromatic alcohol.

24. The process of claim 23 wherein sufficient organic acid is added to provide from 0.8 to 1.0 moles of protons per mole of lithium ions.

25. The process of claim 17 wherein a sufficient amount of the proton source is added to provide at least 3 moles of protons per mole of aluminum.

26. The process of claim 17 wherein the initiator is a dilithium initiator.

27. The process of claim 17 wherein the concentration of the acid in step (f) is from 20 to 40 percent by weight and the phase weight ratio of aqueous acid to polymer cement of from 0.1:1 to 0.25:1.

28. The process of claim 17 wherein the capping agent is selected from the group consisting of those that form chain ends with LiO or LiN bonds.

29. The process of claim 17 wherein the monomer is butadiene or isoprene.

30. The process of claim 29 wherein the monomer is butadiene.

31. The process of claim 17 wherein the polymer is a polydiene diol.

32. The process of claim 31 wherein the polymer is a polybutadiene diol.

* * * * *